UNITED STATES PATENT OFFICE.

EMIL ELSAESSER, OF BARMEN, GERMANY, ASSIGNOR TO DAHL & CO., OF SAME PLACE.

BLUE COLORING-MATTER OBTAINED FROM PARAPHENYLEN-DIAMINE, &c.

SPECIFICATION forming part of Letters Patent No. 392,723, dated November 13, 1888.

Application filed February 21, 1888. Serial No. 264,829. (Specimens.) Patented in Germany March 11, 1886, No. 36,899, and in England August 6, 1886, No. 10,134.

*To all whom it may concern:*

Be it known that I, EMIL ELSAESSER, a subject of the Emperor of Germany, and resident at Barmen, Germany, have invented new and useful Improvements in Coloring-Matter, (which have been patented in Germany March 11, 1886, No. 36,899, and in England August 6, 1886, No. 10,134,) of which the following is a specification.

By the action of aniline and its homologues on sulphate of amidoazo-benzole, hydrochlorate of phenyl-amidoazo-benzole, amidoazo-benzol-monosulpho-acid, phenyl-amidoazo-benzol-monosulpho-acid, and other amidoazo bodies, as is well known, the so-called "indulines" are obtained. These coloring-matters are only soluble in alcohol, but not in water, and for this reason are, so to say, not employed at all for dyeing purposes, while their sulpho-acids are very valuable dye-stuffs. If, however, the phenylen-diamines are allowed to act on the above-named amidoazo compounds in the same manner as the well-known induline process dye-stuffs are obtained, the hydrochloric salts of which are easily soluble in water and have the property of dyeing with an indigo-like blue color cotton which has been mordanted with tannin or emetic tartar. Among these dye-stuffs that have been recognized as the most valuable which is obtained by melting together paraphenylen-diamine with hydrochlorate of amidoazo-benzole with hydrochlorate of phenyl-amidoazo-benzole or with amidoazo-benzol-monosulpho-acid or with phenyl-amidoazo-benzol-monosulpho-acid, the same chemical body being obtained all the same if the paraphenylen-diamine is melted together with hydrochlorate of amidoazo-benzole or with hydrochlorate of phenyl-amidoazo-benzole or with amidoazo-benzol-monosulpho-acid or with phenyl-amidoazo-benzol-monosulpho-acid as long as the said substances are equivalents the one of the other.

I prefer generally to make the new coloring-matter as follows: Fifty kilos of hydrochlorate of amidoazo-benzole are thoroughly mixed with fifty kilos of paraphenylen-diamine and the mixture melted in a closed cast-iron vessel. At a temperature of 140° Celsius ammonia and aniline go off and at the same time a violent reaction takes place, during which a rising of the melting mass above the vessel has to be prevented by strong agitation. The violent reaction having been terminated, the temperature is raised to 185° Celsius and the mass maintained at this temperature during one and one-half to one and three-fourths hours, the mass being continuously and slowly agitated. Then the fluid molten mass is poured into water and freed from aniline by blowing in steam. Then the resinous body which rests on the bottom of the vessel is dissolved by thirty-six kilos of hydrochloric acid after the water has been drawn off. The solution having been cleaned by filtering, common salt is added thereto and the precipitated coloring-matter, after having been filtered off by a filter-press, is pressed off, dried, and ground.

The new coloring-matter thus obtained is a dull copper-colored shining powder, which is easily soluble in cold and in hot water to a reddish-blue color. By treating the same with lye or carbonate of soda the basis of the coloring-matter is precipitated. By the action of oxidizing agents—as, for instance, acid chromate of potassa, chlorate of potassa, and the like—a black precipitate is obtained, which is not soluble in water. By treating it with chloride of zinc a double salt is precipitated, which is almost insoluble in water. Cotton and linen even unmordanted are colored by this coloring-matter with a strong blue color, but much brighter if they have previously been mordanted by means of tannin and emetic tartar. The dyeing is effected by the methods which are well known in the art of cotton-dyeing.

The colors obtained with this coloring-matter are fast colors, withstanding the action of sunlight, and if treated by some acid—chromate of potassa—they are also highly fast against washing.

Having thus described my invention and the manner of employing the same, what I claim as my invention, and wish to have secured to me by Letters Patent of the United States of America, is—

The within-described blue coloring-matter obtained from paraphenylene-diamine and hydrochlorate of amidoazo-benzole or its hereinabove-named equivalents, consisting of a dull copper-colored shining powder soluble in cold and in hot water, the basis of which is precipitated when it is treated with lye or carbonate of soda, and from which when it is treated with an oxidizing agent a black precipitate not soluble in water is obtained, and chloride of zinc precipitating with it a double salt almost insoluble in water.

In testimony whereof I have signed my name to this specification in the presence of two subscribing witnesses.

EMIL ELSAESSER.

Witnesses:
GUSTAV ADOLPH DAHL,
FRANZ GAESS.